(12) United States Patent
Edsö et al.

(10) Patent No.: US 10,440,360 B2
(45) Date of Patent: Oct. 8, 2019

(54) VIDEO PROCESSING SYSTEM

(71) Applicant: ARM Limited, Cambridge (GB)

(72) Inventors: Tomas Edsö, Lund (SE); Ola Hugosson, Lund (SE)

(73) Assignee: Arm Limited, Cambridge (GB)

( * ) Notice: Subject to any disclaimer, the term of this patent is extended or adjusted under 35 U.S.C. 154(b) by 212 days.

(21) Appl. No.: 15/177,685

(22) Filed: Jun. 9, 2016

(65) Prior Publication Data
US 2016/0366408 A1    Dec. 15, 2016

(30) Foreign Application Priority Data

Jun. 11, 2015    (GB) ..................... 1510168

(51) Int. Cl.
| | |
|---|---|
| *H04N 19/423* | (2014.01) |
| *H04N 19/115* | (2014.01) |
| *H04N 19/53* | (2014.01) |
| *H04N 19/59* | (2014.01) |
| *H04N 19/172* | (2014.01) |
| *H04N 19/182* | (2014.01) |
| *H04N 19/63* | (2014.01) |

(Continued)

(52) U.S. Cl.
CPC ......... *H04N 19/115* (2014.11); *H04N 19/172* (2014.11); *H04N 19/182* (2014.11); *H04N 19/423* (2014.11); *H04N 19/53* (2014.11); *H04N 19/59* (2014.11); *H04N 19/44* (2014.11); *H04N 19/63* (2014.11); *H04N 19/85* (2014.11); *H04N 19/96* (2014.11)

(58) Field of Classification Search
None
See application file for complete search history.

(56) References Cited

U.S. PATENT DOCUMENTS

| | | | |
|---|---|---|---|
| 6,108,039 A | 8/2000 | Linzer | |
| 8,358,701 B2 * | 1/2013 | Chou | ................... H04N 19/159 375/240.25 |

(Continued)

FOREIGN PATENT DOCUMENTS

| | | |
|---|---|---|
| EP | 2104356 | 9/2009 |
| EP | 2800369 | 11/2014 |

(Continued)

OTHER PUBLICATIONS

European Search Report dated Oct. 20, 2016, Patent Application EP 16174023.8.

(Continued)

*Primary Examiner* — Jayanti K Patel
*Assistant Examiner* — Shadan E Haghani
(74) *Attorney, Agent, or Firm* — Vierra Magen Marcus LLP

(57) ABSTRACT

A video processing system includes a video processing unit (VPU) and one or more display processing units, all having access to external memory. Video data representing frames to be displayed is generated. The VPU generates pixel data representing the frames and stores it in memory. The display processing units then read the pixel data to display the frames. The VPU is configured to generate and store in memory pixel data representing reference frames for the sequence of video frames at the full resolution of the reference frame and also at at least one lower resolution to the full resolution.

19 Claims, 5 Drawing Sheets

(51) Int. Cl.
  *H04N 19/96* (2014.01)
  *H04N 19/44* (2014.01)
  *H04N 19/85* (2014.01)

(56) References Cited

U.S. PATENT DOCUMENTS

2010/0316127 A1   12/2010  Yokoyama
2016/0241884 A1*  8/2016  Messing ................ H04N 19/85

FOREIGN PATENT DOCUMENTS

| GB | 2495301 | 4/2013 |
| WO | WO2008/013802 | 1/2008 |
| WO | WO2011100174 | 8/2011 |

OTHER PUBLICATIONS

GB Combined Search and Examination Report, dated Nov. 30, 2015, GB Patent Application GB1510168.6.

* cited by examiner

VIDEO PROCESSING SYSTEM

BACKGROUND

The technology described herein relates to the processing of video data. More particularly, the technology described herein relates to a method of and apparatus for processing frames of video data.

It is known in the art for video processing systems to generate frames of video data, typically for provision on an electronic display. A video frame is typically represented as a rectangular array of pixels (picture elements) representing an image, where the colour value to be used for each pixel is indicated using an appropriate colour space, e.g. the RGB color space.

Storing the pixel data for a large number of video frames requires a large amount of memory. Accordingly, a number of video encoding methods have been developed to allow the pixel data representing the video frames to be stored in a compressed form.

According to many such video encoding methods, frames in a sequence of video frames are differentially encoded (i.e. in terms of their differences) relative to a so-called "reference frame", which is a frame for which full resolution pixel data is stored, and which is not defined with reference to another frame. Typically, plural frames of a sequence of video frames are relatively defined with respect to a single reference frame, and this arrangement is repeated over the sequence of video frames.

One such video encoding method uses so-called "motion estimation", wherein a given frame is divided into plural blocks of, e.g., 16×16 pixels, and each block of pixels is encoded with a vector value (the so-called "motion vector") pointing to a corresponding block of pixels in the reference frame, and data (the so-called "residual") describing the differences between the current frame pixel block and the corresponding pixel block in the reference frame. This thereby allows the pixel data for the pixel block of the current frame to be constructed from the pixel data for the pixel block in the reference frame that is pointed to by the motion vector and the residual data describing the differences between that pixel data and the pixel data of the current video frame.

Employing video encoding methods which use reference frames can lead to a significant reduction in memory requirements compared to arrangements where the raw pixel values are stored for each and every frame in a sequence of video frames.

Typically, a new reference frame is generated periodically, e.g. for every N frames in a sequence of frames. The reference frame is then stored in memory for use by the system.

For example, the pixel data for the current reference frame will be generated and stored for use when encoding a sequence of video frames, e.g. to derive the motion vectors and residual values for the frames being encoded in dependence on the reference frame. (Typically, a new reference frame will replace the existing reference frame in memory.)

When decoding a sequence of video frames, e.g. to display a sequence of video frames, the current reference frame will be generated from the encoded video data and, e.g., displayed, and also stored for use when decoding other frames in the sequence that are dependent on the reference frame. (In order to correctly decode differentially encoded video frames, a full resolution reference frame is generated and stored in memory to be used during the decoding process.)

The Applicants believe that there remains scope for improvements to methods of and apparatus for processing frames of video data in a video processing system.

SUMMARY

In one aspect, the technology comprises a method of processing frames of video data in a video processing system, in which data for one or more frames in a sequence of video frames is defined with respect to a reference frame. The method comprises, when all or part of a reference frame for a sequence of video frames is to be used when decoding the sequence of video frames, prior to all or part of the reference frame being used when decoding any of the frames of the sequence of video frames: generating and storing in memory pixel data representing all or part of the reference frame at a first resolution; and generating and storing in memory pixel data representing all or part of the reference frame at at least one different resolution to the first resolution, such that pixel data representing all or part of the reference frame at the first resolution and pixel data representing all or part of the reference frame at the at least one different resolution is present and available in memory at the same time when decoding the sequence of video frames.

In another aspect, the technology comprises an apparatus for processing frames of video data in a video processing system, in which data for one or more frames in a sequence of video frames is defined with respect to a reference frame. The apparatus comprises reference frame generation circuitry configured to, when all or part of a reference frame for a sequence of video frames is to be used when decoding the sequence of video frames, prior to all or part of the reference frame being used when decoding any of the frames of the sequence of video frames: generate and store in a memory of the video processing system, pixel data representing all or part of the reference frame at a first resolution; and generate and store in the memory pixel data representing all or part of the reference frame at at least one different resolution to the first resolution, such that pixel data representing all or part of the reference frame at the first resolution and pixel data representing all or part of the reference frame at the at least one different resolution is present and available in memory at the same time when decoding the sequence of video frames.

Another aspect of the technology comprises a video processing system, in which data for one or more frames in a sequence of video frames is defined with respect to a reference frame. The video processing system comprises: a memory; reference frame generation circuitry configured to, when all or part of a reference frame for a sequence of video frames is to be used when decoding the sequence of video frames, prior to all or part of the reference frame being used when decoding any of the frames of the sequence of video frames, generate and store in the memory pixel data representing all or part of the reference frame at a first resolution, and generate and store in the memory pixel data representing all or part of the reference frame at at least one different resolution to the first resolution, such that pixel data representing all or part of the reference frame at the first resolution and pixel data representing all or part of the reference frame at the at least one different resolution is present and available in memory at the same time when decoding the sequence of video frames; and a processing unit configured to read in from memory the pixel data representing all or part of the reference frame at the at least one different resolution to the first resolution, use the pixel data when performing a processing operation on a frame in the sequence of video frames to generate pixel data representing a processed frame and store the pixel data representing the processed frame in memory.

In another aspect, the technology comprises a computer readable storage medium storing computer software code which when executing on a processor performs a method of processing frames of video data in a video processing system, in which data for one or more frames in a sequence of video frames is defined with respect to a reference frame, the method comprising: when all or part of a reference frame for a sequence of video frames is to be used when decoding the sequence of video frames, prior to all or part of the reference frame being used when decoding any of the frames of the sequence of video frames: generating and storing in memory pixel data representing all or part of the reference frame at a first resolution; and generating and storing in memory pixel data representing all or part of the reference frame at at least one different resolution to the first resolution, such that pixel data representing all or part of the reference frame at the first resolution and pixel data representing all or part of the reference frame at the at least one different resolution is present and available in memory at the same time when decoding the sequence of video frames.

BRIEF DESCRIPTION OF THE DRAWINGS

Embodiments of the technology described herein will now be described by way of example only and with reference to the accompanying drawings, in which.

DETAILED DESCRIPTION

Figure 1:
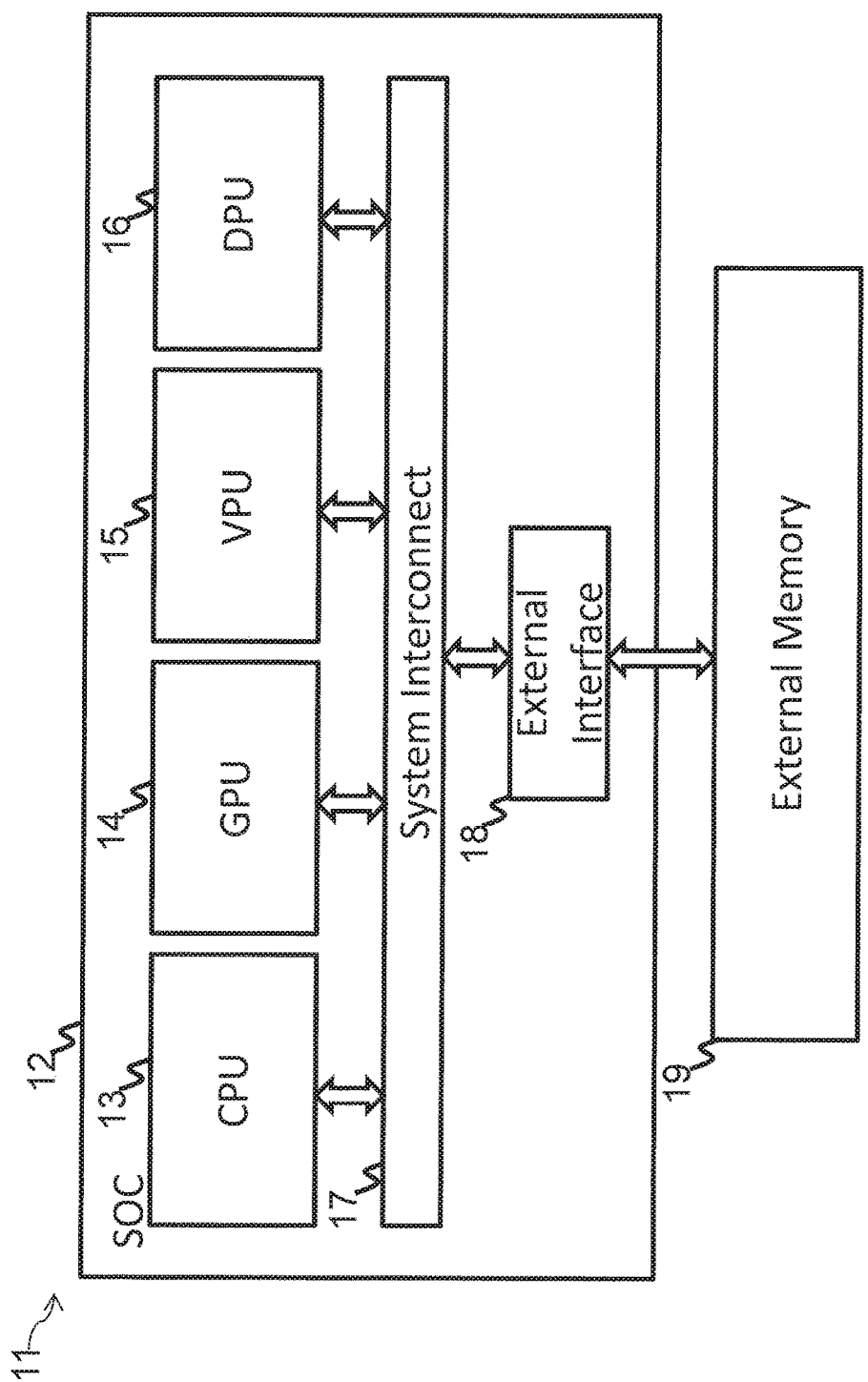
FIG. 1 illustrates schematically an exemplary video processing system that is configured to process frames of video data in a manner according to the technology described herein.

A first embodiment of the technology described herein comprises a method of processing frames of video data in a video processing system, in which data for one or more frames in a sequence of video frames is defined with respect to a reference frame, the method comprising:

when all or part of a reference frame for a sequence of video frames is to be used when decoding the sequence of video frames:

generating and storing in memory pixel data representing all or part of the reference frame at a first resolution; and generating and storing in memory pixel data representing all or part of the reference frame at at least one different resolution to the first resolution.

A second embodiment of the technology described herein comprises an apparatus for processing frames of video data in a video processing system, in which data for one or more frames in a sequence of video frames is defined with respect to a reference frame, the apparatus comprising:

a reference frame generation stage configured to, when all or part of a reference frame for a sequence of video frames is to be used when decoding the sequence of video frames:

generate and store in memory pixel data representing all or part of the reference frame at a first resolution; and generate and store in memory pixel data representing all or part of the reference frame at at least one different resolution to the first resolution.

The technology described herein relates to a method of and apparatus for processing frames of video data in a video processing system that employs differential encoding, i.e. where one or more frames in a sequence of video frames are defined with respect to a reference frame in the sequence.

In the technology described herein, when all or part of a reference frame is required for decoding a sequence of video frames, pixel data representing all or part of the reference frame at a first resolution is generated and stored in memory, e.g., so that it can be used to define and/or decode other (e.g. subsequent) frames in the sequence of video frames in terms of their differences (residuals). However, in addition to generating and storing pixel data representing the reference frame at a first resolution, the technology described herein generates and stores pixel data representing all or part of the same reference frame (or part thereof) at one or more different resolutions to the first resolution.

The embodiments described herein generally refer to generating pixel data, inter alia, for the whole reference frame. However, this is not required. In the technology described herein, the pixel data that is generated and stored in memory can (and in some embodiments does) represent only a part of the reference frame at a first resolution and at least one different resolution.

As will be discussed further below, the Applicants have recognised that providing pixel data representing the same reference frame at at least two different resolutions can be advantageous at various stages of a video processing system, and can provide, e.g., an overall more efficient video processing system. For example, as will be discussed further below, generating pixel data representing the reference frame at not only a first resolution, but also at at least one second, e.g. lower, resolution can be used to facilitate more efficient compression of subsequently generated frames, or to reduce the number of memory accesses required when scaling a given frame for display, for example.

The sequence of video frames comprises one or more frames defined (encoded) with respect to a reference frame. The frames in the sequence can be in any suitable and desired order. However, in embodiments the frames are in the order in which they are to be displayed.

The reference frame itself can be any frame from which one or more frames in the sequence of video frames are defined. In embodiments, the reference frame can be any frame in the sequence of video frames. For example, the reference frame can be before or after the frame or frames in the sequence of frames that are defined with respect to the reference frame. In other arrangements, however, the reference frame is after one or more frames and before one or more other frames in the sequence of frames that are defined with respect to the reference frame.

As will be appreciated by those skilled in the art, there may be a set of many video frames to be decoded, including plural reference frames and respective other frames defined with respect to a respective reference frame. In this case, each reference frame and its related frames can be, and are in an embodiment, treated as a sequence of frames in the manner of the technology described herein. (Correspondingly, a given overall set or sequence of video frames may be made up of (and treated as) plural sequences of video frames of the form of the technology described herein.)

The pixel data representing the reference frame to be used when decoding the sequence of video frames is generated (and stored in memory) as and when a reference frame is required. An embodiment of the technology described herein comprises decoding the sequence of video frames comprises decoding the one or more dependently encoded video frames in the sequence, e.g. to provide the frame(s) for display, (in an embodiment) using the reference frame pixel data.

The pixel data representing the reference frame at a first resolution can be generated in any suitable and desired manner.

In embodiments, the step of generating pixel data representing the reference frame at a first resolution comprises determining appropriate values (e.g. colour values) to be used for the pixels of the reference frame.

In one embodiment, generating pixel data representing the reference frame at a first resolution comprises rendering the pixel values, e.g. using a texture map and/or other, rendering processes.

In an embodiment the step of generating pixel data for the reference frame comprises decoding encoded data representing the reference frame and generating therefrom pixel data representing the reference frame at a first resolution. This may be appropriate where the current reference frame is stored in memory in an encoded form. Thus, in embodiments, generating pixel data representing the reference frame at a first resolution comprises first reading existing reference frame data from memory.

It will be appreciated that the resolution of the reference frame is dependent on the number of individual pixels within the reference frame, which in turn defines the amount of detail with which the reference frame can be represented.

The first resolution, at which the reference fame is represented by the generated pixel data, can be any suitable or desired resolution. However, the Applicants have recognised that it will normally be useful to generate pixel data representing the reference frame at the greatest amount of detail (the maximum resolution) that is possible, so that it can be used later on by the video processing system for decoding purposes, for example. Thus, according to embodiments of the technology described herein, the first resolution is the highest resolution at which pixel data for the reference frame is generated. It is in an embodiment the maximum resolution possible, or the resolution at which the reference frame is represented with the greatest detail (e.g. depending on the available memory etc.). This can be, and is in an embodiment, for example, the resolution at which pixel data would have been generated if the video processing system was configured to generate pixel data representing the reference frame at only a single resolution.

The pixel data representing the reference frame at the at least one different resolution to the first resolution can be generated in any suitable and desired manner.

The pixel data representing the reference frame at at least one different resolution can be generated separately and/or independently from the pixel data representing the reference frame at the first resolution. For example, where the reference frame is generated for the first time, it is possible to individually render the pixel data representing the reference frame at each resolution. Thus, according to an embodiment of the technology described herein, the method comprises generating, e.g. rendering, pixel data representing the reference frame at a first resolution separately to generating, e.g. rendering, the pixel data representing the reference frame at the at least one different resolution to the first resolution.

However, in embodiments, the pixel data representing the reference frame at at least one different resolution to the first resolution is generated based on the pixel data that has been generated for (and which represents) the reference frame at the first resolution. For example, the reference frame generation stage can be (and in an embodiment is) configured to first generate pixel data representing the reference frame at a first resolution (as discussed above), and to generate pixel data representing the reference frame at at least one different resolution that is different to the first resolution using (based on) the pixel data representing the reference frame at the first resolution.

The technology described herein can generate pixel data representing the reference frame at any, e.g. given or selected, number of different resolutions and each resolution that is different to the first resolution can be any suitable or desired resolution (so long as it is not the first resolution).

In embodiments, the technology described herein generates and stores in memory pixel data representing at least one less detailed version of the reference frame than the first resolution version of the reference frame. Thus, according to embodiments, the at least one different resolution to the first resolution comprises at least one lower resolution than the first resolution. For example, the pixel data generated for the reference frame could represent the reference frame at a first resolution of 1080×920 pixels and a second resolution of 720×576 pixels.

Accordingly, the pixel data representing the lower resolution version of the reference frame is in an embodiment a consolidated (and in an embodiment a down sampled (downscaled)) version of the pixel data representing the reference frame at the first resolution. Thus, according to embodiments, the step of generating pixel data representing the reference frame at at least one different resolution to the first resolution comprises consolidating the pixel data representing the reference frame at the first resolution to generate consolidated pixel data representing the reference frame at at least one lower resolution than the first resolution.

Consolidating the pixel data can be done in any suitable or desired way. The consolidated pixel data representing the reference frame at one or more or all of the at least one lower resolutions than the first resolution can be generated from the pixel data representing the reference frame at the first resolution (i.e. the unconsolidated data). Alternatively, where consolidated pixel data representing the reference frame at two or more different, lower resolutions than the first resolution is to be generated, then the consolidated pixel data representing the reference frame at a lower resolution can be generated from the consolidated pixel data representing the reference frame at the preceding higher resolution, for example, and if desired.

In embodiments, consolidating the pixel data comprises averaging or otherwise combining (filtering), the pixel data used to represent the reference frame at a higher resolution for a given, e.g. selected, number of pixels of that higher resolution reference frame. For example, the pixel data can be divided into a plurality of pixel blocks, with each such block of, e.g., four pixels, then (and in an embodiment) being represented by a single pixel having the average pixel (colour) value of the pixels in the block. However, other techniques, such as subsampling the pixel data representing the higher resolution reference frame, can also or instead be used, if desired.

In an embodiment, pixel data representing the reference frame at at least three different resolutions is generated and stored (i.e. at the first resolution) and at at least two different (and in an embodiment lower) resolutions to the first resolution.

In an embodiment, the pixel data that is generated and stored, and which represents the reference frame at a first and at least one different resolution is in the form of two or more or all levels of a mipmap set representing the reference frame. Equally, in embodiments, the reference frame generation stage is configured to generate pixel data representing the reference frame as a mipmap set.

A mipmap set comprises a sequence of frames, each of which is a progressively lower resolution (less detailed) representation of the (same) frame image. (Each version of the frame in the mipmap set is referred to herein as a mipmap level. Unless otherwise indicated, references herein to higher and lower mipmap levels refer to less and more detailed mipmaps, respectively.)

In an embodiment, the height and width of each level of the mipmap set is a factor of two smaller than that of the previous level in the set and each level has a resolution that is one fourth (in terms of the number of pixels) the resolution of the previous level. For example, if the reference frame has a size of 256 by 256 pixels at the first resolution, then the associated mipmap set may contain a series of 8 levels (different versions of the reference frame), wherein each level is one-fourth the total area of the previous one: 128×128 pixels, 64×64, 32×32, 16×16, 8×8, 4×4, 2×2, 1×1 (a single pixel).

Other scaling factors could be used for the mipmap set if desired.

The Applicants have recognised in this regard that although a mipmap set, wherein each level of the mipmap has a strict scaling order, may not necessarily be the most ideal set of resolutions at which to represent the reference frame, it can still be beneficial to generate (and use) pixel data representing the reference frame as a mipmap set.

For example, although the resolution of a mipmap level may not match exactly the resolution of a display that the reference frame is to be displayed on, the Applicants have recognised that the relative ease of generating and handling or processing the representation of the reference frame as respective mipmap levels (compared to other, arbitrary resolutions) should outweigh any potential disadvantages that providing the reference frame in this form may have.

The pixel data that is generated and stored according to the technology described herein may represent an entire mipmap set for the reference frame (i.e. starting from the highest resolution version and including respective lower resolution versions for each mipmap level down to a single pixel (or its equivalent)). However, it is not required for the pixel data to represent each possible level of the mipmap. In an embodiment of the technology described herein, pixel data representing the reference frame at two or more levels of the mipmap are generated and stored in memory. In some embodiments, pixel data representing the reference frame at every other level of the mipmap, i.e. every other version of the reference frame in the sequence of reference frames that would make up a complete mipmap, is generated and stored in memory. In other embodiments, the reference frame generation stage is configured to generate pixel data representing only a particular, e.g. desired, e.g., selected, subset of the levels of the mipmap for the reference frame.

In one embodiment, pixel data representing the whole reference frame at at least one different resolution to the first resolution is generated. However, this is not required. Thus, in other embodiments of the technology described herein, the pixel data representing the reference frame at at least one different resolution to the first resolution represents only a region or a part of the whole reference frame (image). For example, the reference frame generation stage can be configured to consolidate only a subset of the pixel data representing the reference frame at the first resolution.

The video processing system of the technology described herein can be configured to implement the embodiments described above (in relation to generating pixel data representing the reference frame at at least one different resolution to the first resolution) in any suitable or desired manner. For example, the process of generating pixel data representing the reference frame at at least one different resolution to the first resolution can be (and in an embodiment is) triggered and configured by the appropriate driver on the CPU, based on its knowledge of the overall video processing system, for example.

In an embodiment, the reference frame pixel data generation is configured based on how the pixel data for the reference frame is to be used by the video processing system.

For example, and in an embodiment, one or more or all of the at least one different resolution to the first resolution that the reference frame is generated at is selected based on the resolution of an electronic display or displays on which the video sequence is to be displayed. In one embodiment, the at least one different resolution to the first resolution corresponds to the resolution of the output frame to be displayed.

Additionally or alternatively (and in an embodiment additionally), the number of different resolutions at which the reference frame is to be represented is in an embodiment selected based on knowledge of the system. For example, the reference frame generation stage can be configured to generate pixel data representing the reference frame at a single resolution that is different to the first resolution, up to, e.g., as many different resolutions as there are different displays in the overall video processing system on which to display the video sequence.

The pixel data representing the reference frame can be generated by any suitable and desired component of the video processing system. In an embodiment, the pixel data is generated by a suitable processor, such as a graphics processor, a video processor (video engine), a compositor or a display processor of the video processing system. Thus, the reference frame generation stage in an embodiment comprises a graphics processor, a video processor (video engine), a composition engine (a compositor) or a display controller. The reference frame generation stage may comprise more than one processor if desired, and one or more or all of the processors may be operable in the manner of the technology described herein.

The reference frame generation stage may also include other components, such as a decompression stage (a decoding unit) and/or compression stage (an encoding unit), if desired (and in an embodiment this is the case).

In embodiments, the pixel data representing the reference frame at the at least one different resolution that is different to the first resolution is generated by the same processor of the video processing system that generated the pixel data representing the reference frame at the first resolution.

In other embodiments, however, the task of generating pixel data representing the reference frame at a first and at least one different resolution is divided amongst plural processors, and then performed substantially in parallel. In this regard, any desired number of reference frame generation processors can be provided, such as, for example, two reference frame generation processors, up to, e.g., as many reference frame generation processors as the number of different resolutions at which a given reference frame is to be represented.

In embodiments, the pixel data representing the reference frame at at least one different resolution is generated at substantially the same time as the first resolution pixel data, regardless of whether the pixel data is generated by a single or a plurality of reference frame generation stages. In this way, the video processing system should only need to read/access the full resolution reference frame once, rather than each time a different resolution frame is generated.

In an embodiment, the generation of pixel data at at least one different resolution to the first resolution is performed by an existing stage of the video processing system, in an embodiment by a stage that would otherwise normally perform as part of its "normal" processing operations a scaling operation (that can then also be used to generate pixel data representing the same reference frame at different resolutions).

In this regard, the Applicants have recognised that for certain methods of motion estimation, such as hierarchical motion estimation, frames will undergo a scaling process wherein the size and resolution of the frames are reduced. For example several versions of the same image are constructed, each having both dimensions reduced (scaled down) by a certain factor.

Thus, in an embodiment, the video processing system of the technology described herein is one which comprises hardware for performing scaling operations during motion estimation encoding and that hardware is used to generate the pixel data for the reference frame at at least one different resolution to the first resolution. Thus, in an embodiment, the reference frame generation stage comprises scaling hardware that is used for hierarchical motion estimation encoding.

The scaling hardware used for hierarchical motion estimation encoding is a suitable component of the video processing system for generating the pixel data representing the reference frame at different resolutions, as the scaling hardware already operates to perform scaling operations on video data. In this way, the scaling hardware used in hierarchical motion estimation encoding can be shared between (and re-used) by various components of the video processing system (such as one or more reference frame generation processors of the video processing system).

The generated pixel data for the reference frame is stored in memory. It may be stored in any suitable memory, such as, and in an embodiment an appropriate frame buffer, so that it may then be read for later use by the video processing system.

In one embodiment, the generated pixel data is stored in local memory, in an embodiment in an appropriate frame buffer, for the reference frame generation stage. This is in an embodiment the case where the reference frame is immediately required e.g. to decode a sequence of differentially encode video frames.

In another embodiment, the pixel data is stored in a main memory of the video processing system, such as a main memory of the host system that is using the video processing system, such as a hard disk or disks, or a solid state disk, some other form of external storage medium, such as an optical disk (DVD or CD-ROM), flash memory, hard drive, or remotely and accessed over a network connection, etc.

In an embodiment, the pixel data for the reference frame is stored in an encoded (and in an embodiment compressed) form. In particularly embodiments, the pixel data representing the reference frame is encoded using a block-based encoding format. For example, the reference frame can be (and in an embodiment is) divided into a plurality of blocks (macroblocks) of pixels of the frame (e.g. 16×16 pixel blocks in the case of MPEG encoding) and the pixel data for each block is encoded individually. In an embodiment, the reference frame is encoded according to any one of the methods disclosed in the Applicant's US patent application US 2013/036290, and/or U.S. Pat. No. 8,542,939, the contents of which are incorporated herein by reference.

Thus, in embodiments, the pixel data that represents the reference frame at the first and at at least one other resolution is stored in a compressed form. Correspondingly the two or more or all levels of a mipmap set representing the reference frame are in an embodiment stored in memory in a compressed form.

In this regard, the pixel data (e.g. mipmap set) may be compressed in any suitable and desired way. In embodiments, the pixel data (the layer (e.g. the lower layer) of the mipmap set) which represents the reference frame at full resolution (i.e. which represents the bitexact version of the reference frame) is compressed using a lossless compression scheme (so that it can be used to decode subsequent frames). For the other resolutions (layer(s)), which represent the reference frame at the one or more other, e.g. lower, resolutions, a lossy compression scheme can be (and in embodiments is) used.

Each level of the mipmap set may be compressed with any, e.g. selected or desired, compression scheme and/or compression rate. In an embodiment, one or more of the methods disclosed in the Applicant's US patent application US 2013/036290, and/or U.S. Pat. No. 8,542,939 are used to compress the pixel data. The compression scheme and/or compression rate used to compress the reference frame data may be (and in some embodiments is) selected based on the resolution at which the pixel data being compressed represents the reference frame (e.g. which level of the mipmap is being compressed).

In some embodiments the compression stage (the encoding unit) of the reference frame generation stage is configured to compress different resolution versions of the reference frame (different levels of the mipmap set) with different compression rates. For example, if the full resolution layer in compressed form is represented using 10 bits of data, then the other layers could (and in some embodiments would) use fewer bits, such as 8 bits (in effect, a guaranteed compression of 20%). Similarly, the lower resolution layer(s) could remove chroma information by, e.g., converting from 4:2:2 sampling to 4:2:0 sampling (in effect, a guaranteed compression of 25%).

Compressing the pixel data (e.g. mipmap set) representing the reference frame according to the embodiments described above is advantageous in that it reduces memory bandwidth further. It is also a particularly suitable arrangement for dealing with video content, given that video content is typically already compressed (which means high-frequency content has been removed, making it more suitable for compression).

As mentioned above, pixel data representing the reference frame at at least one different resolution to the first resolution can be used advantageously at various stages of the video processing system.

Thus, according to embodiments, the method of the technology described herein further comprises processing at least one frame in the sequence of video frames, e.g. for display, using the pixel data representing the reference frame at at least one different resolution to the first resolution.

Accordingly, in embodiments, the apparatus of the technology described herein further comprises a frame processing stage configured to process at least one frame in the sequence of video frames using the pixel data representing the reference frame at at least one different resolution to the first resolution.

In this regard, the Applicants have recognised that pixel data representing the reference frame at different resolutions can be used advantageously on the decoding side of the video process, e.g. where the sequence of video frames is being processed for display. For example, it may be desirable to use pixel data representing the reference frame at at least one different (and in an embodiment lower) resolution than the first resolution when providing an output frame or frames for display (and in an embodiment, this is done).

This may be particularly true in arrangements where the current frame in the sequence of video frames is to be displayed at a resolution that is different to the first resolution of the reference frame. This may be the case, for example, when providing an output frame or frames for display on a display that has a resolution that is lower than the first resolution of the reference frame. Another example would be when providing an output frame or frames that are to be displayed in a portion (e.g. a window) of the overall display, wherein the portion of the display has a resolution that is lower than the first resolution of the reference frame. In such cases, the output frame representing the current video frame will correspond to a set of pixels having a lower resolution than the first resolution of the reference frame. (Thus the output frame that is being generated may, e.g., completely fill the display in question, or may be for a window that is being displayed on a display.)

As is known in the art, providing an output frame for display comprises, for example, loading pixel data into a suitable frame buffer, from where it can then be read and provided to a display. In many cases this will involve generating pixel data for the output frame based on at least the full resolution pixel data representing the corresponding reference frame.

However, according to an embodiment of the technology described herein, where the current frame is to be displayed at a lower resolution than the first resolution of the reference frame, instead of generating pixel data for the output frame using the pixel data for the first, i.e. full, resolution reference frame, pixel data representing a lower resolution reference frame can be (and in an embodiment is) used for this purpose. Thus, an embodiment of the technology described herein comprises the step of processing at least one frame in the sequence of video frames comprises generating pixel data representing an output frame for display using the pixel data representing the reference frame at at least one lower resolution than the first resolution.

In some embodiments, the pixel data for the lower resolution reference frame can be used as the pixel data for the output frame. For example, where the current frame to be displayed in the sequence of video frames is (e.g. flagged as) the reference frame itself, then in order to generate the output frame, the video processing system (particularly the frame processing stage) will use only the lower resolution pixel data for the reference frame. (It will be appreciated that although in this embodiment only the lower resolution pixel data for the reference frame is used as an output frame, the video processing system (e.g. the video processing engine) may, and in an embodiment does, still generate (and store in memory) pixel data representing the reference frame at the first, i.e. full, resolution so that it can be used to decode other frames in the sequence of video frames).

This could also be (and in some embodiments is) the case in arrangements where the current frame to be displayed is a differentially encoded frame and where the residuals for the current frame are equal to zero. For example, if a given block of the current frame is unchanged compared to the reference frame, then the video processing system can (and in an embodiment will) use the pixel data for the corresponding block in the (lower resolution version of the) reference frame as the pixel data for the output frame.

In an embodiment, one of the at least one lower resolution than the first resolution, at which pixel data for the reference frame is generated, corresponds to the resolution required for the output frame to be displayed. In such cases, pixel data representing the reference frame at the at least one lower resolution that corresponds to the output frame resolution can be (and in an embodiment is) used (and e.g. outputted) directly as the pixel data for the output frame.

Thus, an embodiment of the technology described herein comprises generating pixel data representing an output frame for display using the pixel data representing the reference frame at at least one lower resolution than the first resolution comprises outputting pixel data representing the reference frame at one of the at least one lower resolution than the first resolution directly as the output frame.

However, in arrangements where the generated lower resolution version of the reference frame does not correspond to the resolution required for the output frame (e.g. display), it may be necessary to perform a scaling operation to derive the final pixel data for the output frame. Thus, an embodiment of the technology described herein comprises generating pixel data representing an output frame for display using the pixel data representing the reference frame at at least one lower resolution than the first resolution comprises performing a scaling operation on the pixel data representing the reference frame at at least one lower resolution than the first resolution when deriving the final pixel data for the output frame.

In this case, the lower resolution version of the reference frame that is used is in an embodiment selected so as to reduce, e.g. minimise, the amount of scaling processing that may be required, e.g. by using the resolution that is closest to the actually required resolution.

Where the current frame to be displayed is a differentially encoded frame, i.e. a frame that has been encoded with respect to the full resolution pixel data representing the reference frame (and that does not have zero residuals), then in order to generate correctly an output frame for display, the differentially encoded frame to be displayed will normally be decoded from the differentially encoded pixel data representing the current frame and the pixel data representing the full resolution reference frame. The decoded pixel data for the frame will then normally be stored in memory, from which it can be fetched, e.g., by a display unit and scaled down to fit the output frame resolution if necessary.

However, according to embodiments of the technology described herein, instead of first decoding the pixel data for the current frame (at full resolution) and storing it in memory, the frame processing stage is configured not to store full resolution pixel data representing the (decoded) current frame in memory. Instead, the frame processing stage is configured to generate and store pixel data representing the (decoded) current frame at a lower resolution only.

This can be (and in an embodiment is) done by (e.g. the frame processing stage) reading in and using the full resolution pixel data representing the reference frame to decode the current frame to be displayed, and using the (decoded)

pixel data representing the current frame at full resolution internally to generate pixel data representing the current frame at one or more different resolutions to the full resolution. Only the pixel data representing the current frame at the one or more different resolutions to the full resolution is then stored in memory (for use later in the system).

Thus, an embodiment of the technology described herein comprises the method further comprises, if the current frame to be displayed is encoded with respect to the reference frame:

decoding the current frame using the encoded pixel data for the current frame and the pixel data representing the reference frame at the first resolution;

generating and storing in memory pixel data representing the current frame at at least one different resolution to the first resolution; and generating pixel data representing an output frame using the pixel data representing the current frame at the at least one different resolution than the first resolution.

In embodiments, generating pixel data representing the current frame at at least one different resolution to the first (e.g. full) resolution comprises performing one or more scaling operations on the pixel data representing the current fame at the first resolution.

The Applicants have recognised that although this embodiment does not utilise the pixel data representing the reference frame at a lower resolution than the first resolution, there is still an advantage to using the full resolution reference frame to generate pixel data representing multiple resolution versions of the current frame to be displayed. For example, having lower resolution versions of the current frame to be displayed allows a display controller to read in only the smaller version of the current frame (not the full resolution version) in order to derive the pixel data for an output frame to be displayed, thereby saving on the number of memory accesses, and memory bandwidth, for example. This is particularly advantageous where the at least one lower resolution corresponds to the resolution required by the display.

In other embodiments, the video processing system (e.g. the frame processing stage) is configured to first scale down the (differentially) encoded pixel data for the current frame (i.e. by consolidating the motion vectors and residuals data) to a lower resolution and then derive and generate final, i.e. decoded, pixel data for the output frame based on the "scaled down" version of the current frame and the pixel data representing the reference frame at an at least one lower resolution.

Thus, according to an embodiment, generating an output frame for display comprises consolidating the (differentially encoded) pixel data representing a current frame to be displayed at a first resolution to generate consolidated pixel data representing the current frame at a second, different (e.g. lower) resolution than the first resolution, and deriving final pixel data for the output frame based on the consolidated data representing the current frame and the pixel data representing the reference frame at one of the at least one lower resolution at which pixel data for the reference frame has been generated.

In embodiments, the first resolution of the current (differentially encoded) frame is the same as the first resolution of the reference frame and/or the second resolution of the current (differentially encoded) frame is the same as one of the at least one lower resolution at which pixel data for the reference frame has been generated.

According to embodiments, deriving final pixel data for the output frame based on the consolidated data representing the current frame and the pixel data representing the reference frame at the one of the at least one lower resolution comprises decoding the consolidated (and differentially encoded) pixel data for the current frame using the pixel data representing the reference frame at the one of the at least one lower resolution. The decoded (consolidated) pixel data can then be (and in some embodiments is) used directly as the final pixel data for the output frame. In other embodiments, however, the decoded pixel data is scaled in order to derive the final pixel data for the output frame. This is required, for example, where the resolution of the decoded pixel data is not the same as the output frame resolution.

Thus, according to an embodiment, the technology described herein comprises performing a scaling operation on the pixel data representing the decoded version of the current frame to be displayed to derive the final pixel data for the output frame. The scaling operation in an embodiment comprises scaling the pixel data representing the decoded version of the current frame to provide pixel data representing the decoded version of the current frame at the (desired) output frame resolution.

Using lower resolution pixel data for the reference frame when generating frames for display in this way is advantageous in that the display process needs only to read in the smaller reference frame and not the full resolution version in order to derive the pixel data for an output frame or frames to be displayed, thereby saving on the number of memory accesses, and memory bandwidth, for example.

As mentioned above, the reference frame generation stage can be configured to control an aspect of reference frame generation based on knowledge of the requirements of the data processing system. Thus, where the required output frame (e.g. display) resolution is known to the data processing system, the reference frame generation stage may be configured to generate pixel data for the reference frame based on the display output frame resolution. Equally, where the video processing system comprises more than one display unit, the reference frame generation stage can be (and in an embodiment is) configured to generate pixel data representing the reference frame based on each different display output frame resolution. In these cases, the reference frame may be generated at the required output display frame resolution, and/or at a resolution that is closer to the required output display frame resolution (and then scaled to that resolution if required).

The Applicants believe that a video processing system configured to operate in a manner described above is new and advantageous in its own right.

Thus, a third embodiment, the technology described herein comprises a video processing system, in which data for one or more frames in a sequence of video frames is defined with respect to a reference frame, the video processing system comprising:

a memory;

a processing unit (e.g. a video processor) configured to, when all or part of a reference frame for a sequence of video frames is to be used when providing an output frame for display:

generate and store in the memory pixel data representing all or part of the reference frame at a first resolution and at at least one different resolution to the first resolution; and a display controller configured to:

read in from the memory the pixel data representing all or part of the reference frame at the at least one different resolution to the first resolution;

use the pixel data when generating an output frame to be displayed; and output the generated output frame to a display.

A fourth embodiment of the technology described herein comprises a method of operating a video processing system, in which data for one or more frames in a sequence of video frames is defined with respect to a reference frame, the method comprising:

a processing unit (e.g. a video processor) of the video processing system, when all or part of a reference frame for a sequence of video frames is to be used when providing an output frame for display:

generating and storing in the memory pixel data representing all or part of the reference frame at a first resolution and at at least one different resolution to the first resolution; and a display controller of the video processing system:

reading in from the memory the pixel data representing all or part of the reference frame at the at least one different resolution to the first resolution;

using the pixel data when generating an output frame to be displayed; and outputting the generated output frame to a display.

As will be appreciated by those skilled in the art, these embodiments of the technology described herein can and in an embodiment do include any one or more of the features of the technology described herein described herein, as appropriate. Thus, for example, the video processing system in an embodiment further comprises a display.

In addition to its use when generating an output frame for display, the Applicants have recognised that having pixel data representing the reference frame at the at least one different resolution to the first resolution can also be used to facilitate performing processing operations on a video frame or frames, e.g. to be displayed.

Such a processing operation could comprise, for example, a transformation operation, such as scaling, rotation and/or skewing of a frame to be displayed. This operation may be performed by any suitable unit or stage of the overall video and data processing system, such as a graphics processor, a composition engine, a CPU, and/or a display controller that has the ability to perform such operations.

Thus, an embodiment of the technology described herein comprises processing at least one frame in the sequence of video frames using the pixel data representing the reference frame at at least one different (e.g. lower) resolution than the first resolution comprises performing a transformation operation on the at least one frame in the sequence of video frames using the pixel data representing the reference frame at at least one different (e.g. lower) resolution than the first resolution. Equally, according to an embodiment, the frame processing stage of the technology described herein comprises a processor (e.g. a graphics processor) that is capable of and configured to perform at least one transformation operation on the at least one frame in the sequence of video frames using the pixel data representing the reference frame at at least one different resolution (e.g. lower) to the first resolution.

In embodiments, the transformation operation comprises at least one of a scaling, rotation, and skewing operation. The transformation operation could (and in some embodiments does) comprise interpolating between frames of the sequence of video frames.

The Applicants have recognised that generating and using pixel data representing the reference frame at at least one lower resolution than the first resolution may be beneficial when performing processing operations in that the video processing system will require less memory accesses to read the reference frame compared to when using a higher resolution version of the reference frame.

Also, the Applicants have recognised that having multiple resolution versions of the reference frame available (e.g. to a GPU) at the same time may facilitate performing processing operations, such as scaling, in a more efficient and/or sophisticated manner. For example, having multiple resolution versions of the reference frame that can be used simultaneously may facilitate performing operations for visually flipping through frames on a display (such as "coverflow"-type operations).

The Applicants again believe that a video processing system configured to operate in this manner is new and advantageous in its own right.

Thus, another embodiment of the technology described herein comprises a video processing system, in which data for one or more frames in a sequence of video frames is defined with respect to a reference frame, the video processing system comprising:

a memory;

a first processing unit (e.g. a video processor) configured to, when all or part of a reference frame for a sequence of video frames is to be used when providing an output frame for display:

generate and store in memory pixel data representing all or part of the reference frame at a first resolution and at at least one different resolution to the first resolution; and a second processing unit (e.g. a graphics processor) configured to:

read in from memory the pixel data representing all or part of the reference frame at the at least one different resolution to the first resolution;

use the pixel data when performing a processing operation on a frame in the sequence of video frames to generate pixel data representing a processed frame; and store the pixel data representing the processed frame in memory.

Another embodiment of the technology described herein comprises a method of operating a video processing system, in which data for one or more frames in a sequence of video frames is defined with respect to a reference frame, the method comprising:

a first processing unit (e.g. a video processor) of the video processing system, when all or part of a reference frame for a sequence of video frames is to be used when providing an output frame for display:

generating and storing in memory pixel data representing all or part of the reference frame at a first resolution and at at least one different resolution to the first resolution; and a second processing unit (e.g. a graphics processor) of the video processing system:

reading in from memory the pixel data representing all or part of the reference frame at the at least one different resolution to the first resolution;

using the pixel data when performing a processing operation on a frame in the sequence of video frames to generate pixel data representing a processed frame; and storing the pixel data representing the processed frame in memory.

As will be appreciated by those skilled in the art, these embodiments of the technology described herein can and in an embodiment do include any one or more of the features of the technology described herein described herein, as appropriate. Thus, for example, the video processing system in an embodiment further comprises a display and/or the system in an embodiment further comprises a display controller configured to: read in from memory the pixel data representing the processed frame; use the pixel data when generating an output frame to be displayed; and output the generated output frame to a display.

Similarly, the first processing unit is in an embodiment a video processor, and the second processing unit is in an embodiment one of a graphics processor, a composition engine, a central processing unit (CPU), or a display controller that is operable to perform processing operations on frames to be displayed. There may be more than one "second" processing unit that uses the pixel data representing all or part of the reference frame at the at least one different resolution to the first resolution when performing a processing operation on a frame in the sequence of video frames to generate pixel data representing a processed frame, if desired.

Correspondingly, the processing operation in an embodiment comprises a transformation operation, such as scaling, rotation and/or skewing of a frame to be displayed.

It will be appreciated that although the above embodiments have been described primarily with reference to generating pixel data representing an output frame for display, the principles and techniques described above can be used wherever pixel data representing a frame is to be generated based on pixel data representing a reference frame. For example, in one arrangement, the principles and techniques described above can also be used, e.g. by a composition engine, to derive and generate pixel data representing a composited frame from two or more separate source frames, each having their own reference frames stored in memory. In that case, the lower resolution reference frame for one or more of the source frames can be used to generate a composited frame.

As the video processing system of the technology described herein has the facility to provide multiple different resolution versions of a reference frame, this could also be used to provide pixel data representing a reference frame at different resolutions for use when encoding a sequence of video frames, if desired. This may be useful, for example, for performing motion estimation operations when encoding a sequence of video frames.

Thus, in an embodiment of the technology described herein, processing at least one frame in the sequence of video frames using the pixel data representing the reference frame comprises encoding (and in an embodiment performing motion estimation for) at least one frame in a sequence of video frames using the pixel data representing the reference frame at a different, and in an embodiment lower, resolution than the first resolution. Correspondingly, in an embodiment, the frame processing stage comprises an encoding unit.

Furthermore, whilst the embodiments described above have been described with reference to entire frames, the techniques and principles of the technology described herein can equally be (and in one embodiment are) applied to only a part of a frame. For example, pixel data representing the entire reference frame (or a part thereof) at at least one different resolution to the first resolution can be used to process only a part of a frame in a sequence of video frames.

The technology described herein can be implemented in any desired and suitable data processing system that is operable to generate frames of video data for display, e.g. on an electronic display.

The frame processing stage in this regard in an embodiment comprises a suitable processor, such as a graphics processor, a video processor, a compositor or a display controller. In some embodiments, the frame processing stage comprises the same processor or processors as the reference frame generation stage.

Whilst the technology described herein has been described above with respect to reference frames in a sequence of video frames, the technology described herein is applicable more generally to any kind of frames of data, such as those representing still images (e.g. JPEGs).

Thus, an embodiment of the technology described herein comprises an apparatus for processing frames of data in a video processing system, the apparatus comprising:
  a processing unit (e.g. a video processing unit) configured to, when all or part of a frame is to be used for further processing:
  generate (and in an embodiment store in memory) pixel data representing all or part of the frame at a first resolution; and
  generate and store in memory pixel data representing all or part of the frame at at least one different resolution to the first resolution.

Another embodiment of the technology described herein comprises a method of processing a frame of data in a video processing system, the method comprising:
  when all or part of the frame is to be used for further processing:
  generating (and in an embodiment storing in memory) pixel data representing all or part of the frame at a first resolution; and
  generating and storing in memory pixel data representing all or part of the frame at at least one different resolution to the first resolution.

It will be appreciated that these embodiments can (and in an embodiment do) include one or more or all of the optional features and embodiments described herein.

Thus, for example, the at least one different resolution to the first resolution is in an embodiment a lower resolution than the first resolution. Similarly, the pixel data that is generated, and which represents the frame at a first and at least one different resolution, is in an embodiment in the form of two or more or all levels of a mipmap set representing the frame. Equally, in embodiments, the processing unit is configured to generate pixel data representing the frame as a mipmap set. Again, in an embodiment, the height and width of each level of the mipmap set is a factor of two smaller than that of the previous level in the set and each level has a resolution that is one fourth (in terms of the number of pixels) the resolution of the previous level. (However, other scaling factors could be used for the mipmap set if desired.)

The pixel data that is generated and stored may represent an entire mipmap set for the frame (i.e. starting from the highest resolution version and including respective lower resolution versions for each mipmap level down to a single pixel (or its equivalent)). However, it is not required for the pixel data to represent each possible level of the mipmap.

In these embodiments of the technology described herein, the pixel data representing the frame of data at two or more different resolutions is again in an embodiment stored in memory in a compressed form, in an embodiment in one or more of the manners discussed above. Thus, in embodiments the processing unit comprises a compression stage (an encoding unit).

In one embodiment, pixel data representing the whole frame at at least one different resolution to the first resolution is generated. However, this is not required. Thus, in other embodiments, the pixel data representing the frame at at least one different resolution to the first resolution represents only a region or a part of the whole frame (image).

In embodiments, the pixel data representing the frame at at least one different resolution to the first resolution is generated based on (e.g. using) the pixel data that has been generated for (and which represents) the frame at the first resolution.

In embodiments of the technology described herein, the frame that is to be used for further processing is a frame of data representing a still image, i.e. a fully defined frame that is not encoded with respect to another frame. In embodiments, the frame is a frame that is encoded according to the format defined by the Joint Photographic Experts Group (JPEG).

The Applicants have recognised that, similarly to the case of reference frames, providing pixel data representing a still image (e.g. a JPEG image) at at least two different resolutions would be advantageous at a number of stages of a video processing system, and could provide, e.g., an overall more efficient video processing system.

According to embodiments, the apparatus of the technology described herein further comprises a frame processing stage (e.g. a graphics processing unit) configured to process a frame, e.g. for display, using the pixel data representing the frame at an at least one different resolution to the first resolution. Equally, according to embodiments the technology described herein further comprises processing the frame, e.g. for display, using the pixel data representing the frame at an at least one different resolution to the first resolution.

Processing the frame using the pixel data representing the frame at at least one different (e.g. lower) resolution than the first resolution can (and in an embodiment does) comprise performing a transformation operation on the frame using the pixel data representing the frame at at least one different (e.g. lower) resolution than the first resolution. Equally, in an embodiment, the frame processing stage of the technology described herein comprises a processor (e.g. a graphics processing unit or compositor) that is capable of and configured to perform at least one transformation operation on the frame using the pixel data representing the reference frame at at least one different resolution (e.g. lower) to the first resolution.

In embodiments, the transformation operation comprises at least one of a scaling, rotation, and skewing operation. The transformation operation could (and in some embodiments does) comprise interpolating between plural frames in a set of still image frames.

The Applicants have recognised that generating and using pixel data representing the frame at at least one lower resolution than the first resolution may be beneficial when performing processing operations in that the processing system will require less memory accesses to read the frame compared to when using a higher resolution version of the frame.

Also, the Applicants have recognised that having multiple resolution versions of the frame available (e.g. to a GPU) at the same time may facilitate performing processing operations, such as scaling, in a more efficient and/or sophisticated manner. For example, having multiple resolution versions of the frame that can be used simultaneously may facilitate performing operations for visually flipping through frames on a display (such as "coverflow"-type (mapping to rotating planes) operations).

In an embodiment the technology described herein is implemented in a data processing system that is a system for displaying windows, e.g. for a graphical user interface, on a display, and in an embodiment a compositing window system.

The data (video) processing system that the technology described herein is implemented in can contain any desired and appropriate and suitable elements and components. Thus it may, and in an embodiment does, contain one or more of, and in an embodiment all of: a CPU, a GPU, a video processor, a display controller, a display (e.g. an LCD or an OLED display), and appropriate memory for storing the various frames and other data that is required.

The generated frame(s) to be displayed and the output frame for the display (and any other source surface (frames)) can be stored in any suitable and desired manner in memory. They are in an embodiment stored in appropriate buffers. For example, the output frame is in an embodiment stored in an output frame buffer.

The output frame buffer may be an on-chip buffer or it may be an external buffer. Similarly, the output frame buffer may be dedicated memory for this purpose or it may be part of a memory that is used for other data as well. In some embodiments, the output frame buffer is a frame buffer for the video processing system that is generating the frame and/or for the display that the frames are to be displayed on.

Similarly, the buffers that the generated frames are first written to when they are generated (rendered) may comprise any suitable such buffers and may be configured in any suitable and desired manner in memory. For example, they may be an on-chip buffer or buffers or may be an external buffer or buffers. Similarly, they may be dedicated memory for this purpose or may be part of a memory that is used for other data as well. The input frame buffers can be, e.g., in any format that an application requires, and may, e.g., be stored in system memory (e.g. in a unified memory architecture), or in graphics memory (e.g. in a non-unified memory architecture). In some embodiments, the video processing system comprises, and/or is in communication with, one or more memories and/or memory devices that store the data described herein, and/or store software for performing the processes described herein. The video processing system may also be in communication with a host microprocessor, and/or with a display for displaying images based on the data generated by the video processor.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements, stages and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

The technology described herein is in an embodiment implemented in a portable device, such as, and in an embodiment, a mobile phone or tablet.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described. FIG. 1 shows schematically an embodiment of a video processing system 11 that can perform the basic operation of the technology described herein.

As shown in FIG. 1, the video processing system 11 may comprise a system on-chip (SoC) 12 which includes a central processing unit (CPU) 13, a graphics processing unit (GPU) 14, a video processing unit (VPU) 15, a display processing unit 16 and an external interface 18, all having access to external (e.g. off-chip) memory 19. Separate to the SoC and external memory is the display itself (not shown).

The GPU 14 and VPU 15 may include suitable compressors (and corresponding de-compressors) for encoding (compressing) data (e.g. a frame) to be stored in memory in a compressed form. Accordingly, the display processing unit 16 may include a de-compressor for decompressing data (e.g. a frame to be displayed).

In accordance with the present embodiments, a sequence of (compressed) video frames will be provided to the video engine from an external source for decoding. In other embodiments, a frame to be displayed is generated as desired by, for example, being appropriately rendered by the GPU 14 or video engine 15.

If the current frame being processed by the video engine is a so-called reference frame (and so is to be used when decoding other frames in the sequence of video frames), then pixel data representing the full resolution version of the reference frame will be generated and stored in a buffer within the external memory 19. However, in addition to generating pixel data representing the reference frame at full resolution (i.e. the original intended resolution), the video engine will, in accordance with the present embodiments, generate and store in the external memory 19 pixel data representing the reference frame at at least one different resolution to the first, full resolution.

Generating pixel data representing the reference frame at not only a first resolution, but also at at least one second, e.g. lower, resolution can be used to facilitate more efficient compression of subsequently generated frames, or to reduce the number of memory accesses required when generating an output frame for display.

For example, pixel data representing the reference frame at multiple resolutions can be fetched from the external memory 19 and used by an appropriate encoding unit (not shown) to encode (e.g. perform motion estimation for) at least one frame in a sequence of video frames. (Whilst the encoding unit is not shown in the Figures, it will be appreciated that the encoding unit can be a separate unit on the SoC arrangement, or may be integrated within an appropriate component of the video processing system, such as the video processing unit 15.)

In other embodiments, pixel data representing the reference frame at different resolutions is fetched from external memory 19 and used to generate an output frame for display.

For example, where the frame to be displayed is the reference frame, the pixel data representing the reference frame at the most appropriate resolution for the display may be fetched from the external memory 19 by the display processing unit 16 and output for display. It will be appreciated that in some cases the display processing unit 16 (or GPU 14, for example) may perform a scaling operation on the pixel data representing the reference to provide an output frame at the correct resolution for the display size.

Where the frame to be displayed is not flagged as a reference frame but is encoded relative to the reference frame, the video processing unit 15, for example, retrieves the pixel data representing the reference frame from memory 19 and uses it to decode the current frame and generate pixel data representing the current frame at a desired resolution (in an embodiment the output frame resolution).

It will be understood that although the arrangement of FIG. 1 shows only two frame generators (the GPU 14 and video engine 15), the video processing system of the technology described herein could include any number (and types) of frame generators, as appropriate.

Figure 2:
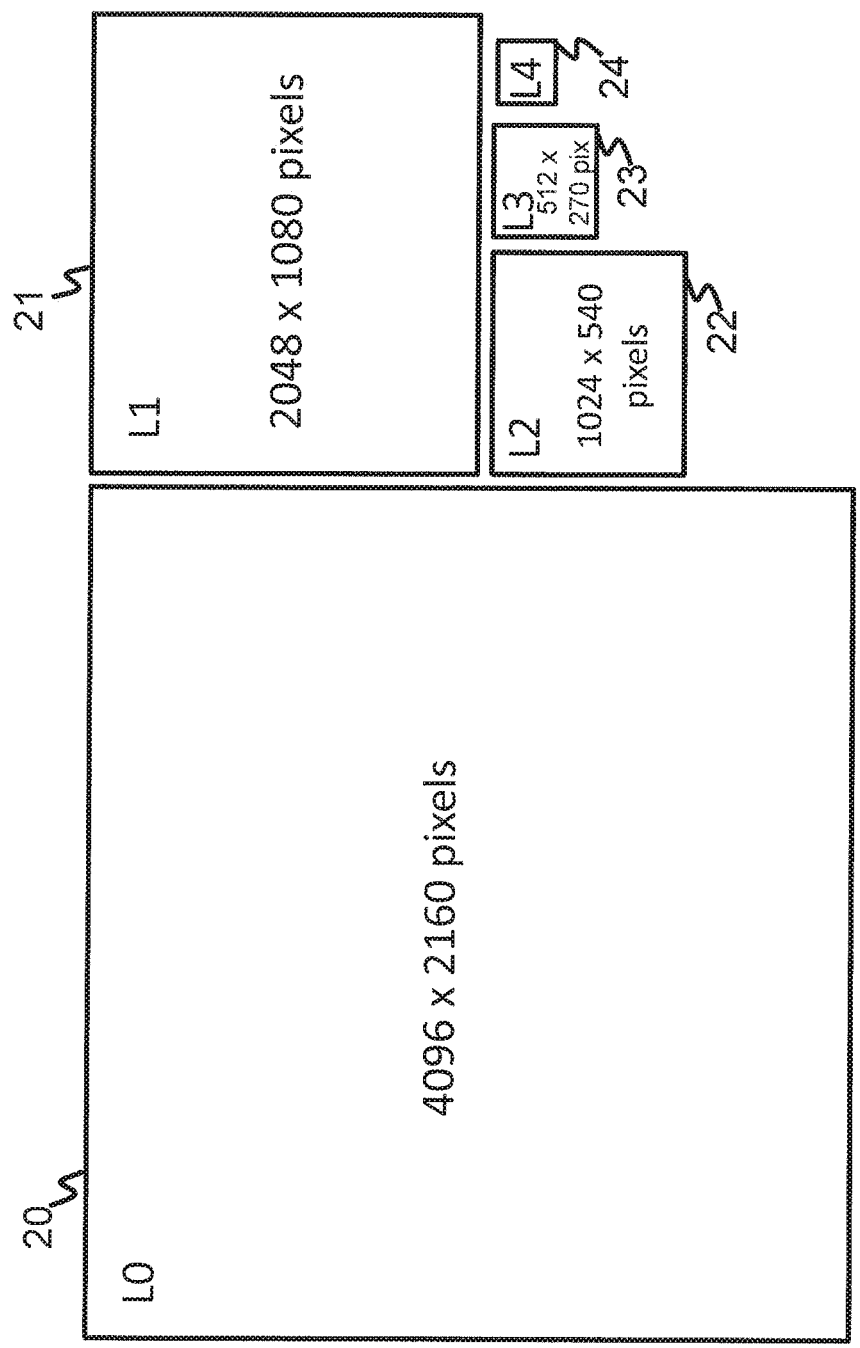
FIG. 2 illustrates schematically a reference frame represented as a mipmap set of progressively lower resolution versions of the (same) reference frame image.

FIG. 2 illustrates a reference frame represented as a mipmap set of progressively lower resolution versions of the (same) reference frame image.

As mentioned above, in an embodiment, the pixel data that is generated and stored, and which represents the reference frame at a first and at least one different resolution is in the form of two or more or all levels of a mipmap set representing the reference frame. Each version of the frame in the mipmap set is referred to as a mipmap level, wherein the lowest level, L0 (20), is the most detailed version of the reference frame and the highest level, L4 (24), is the least detailed version.

As shown in FIG. 2, in this embodiment the height and width of each level of the mipmap set is a factor of two smaller than that of the previous level in the set and each level has a resolution that is one fourth (in terms of the number of pixels) the resolution of the previous level. In the embodiment shown in FIG. 2, the reference frame has an original, full resolution of 4096 by 2160 pixels at the first level L0, and the associated mipmap set contains a series of 5 levels (L0 through L4), wherein each level is one-fourth the total area of the previous one: 2048×1080 pixels, 1024× 540, 512×270, 256×135.

It will be appreciated that the pixel data that is generated and stored according to the technology described herein may represent an entire mipmap set for the reference frame (i.e. starting from the highest resolution version and including respective lower resolution versions for each mipmap level down to a single pixel (or its equivalent)) or only a particular, e.g. desired, e.g., selected, subset of the levels of the mipmap for the reference frame.

It will also be appreciated that in accordance with some embodiments of the technology described herein, only a region or a part of the whole reference frame is represented at a given level of the mipmap set.

Figure 3:
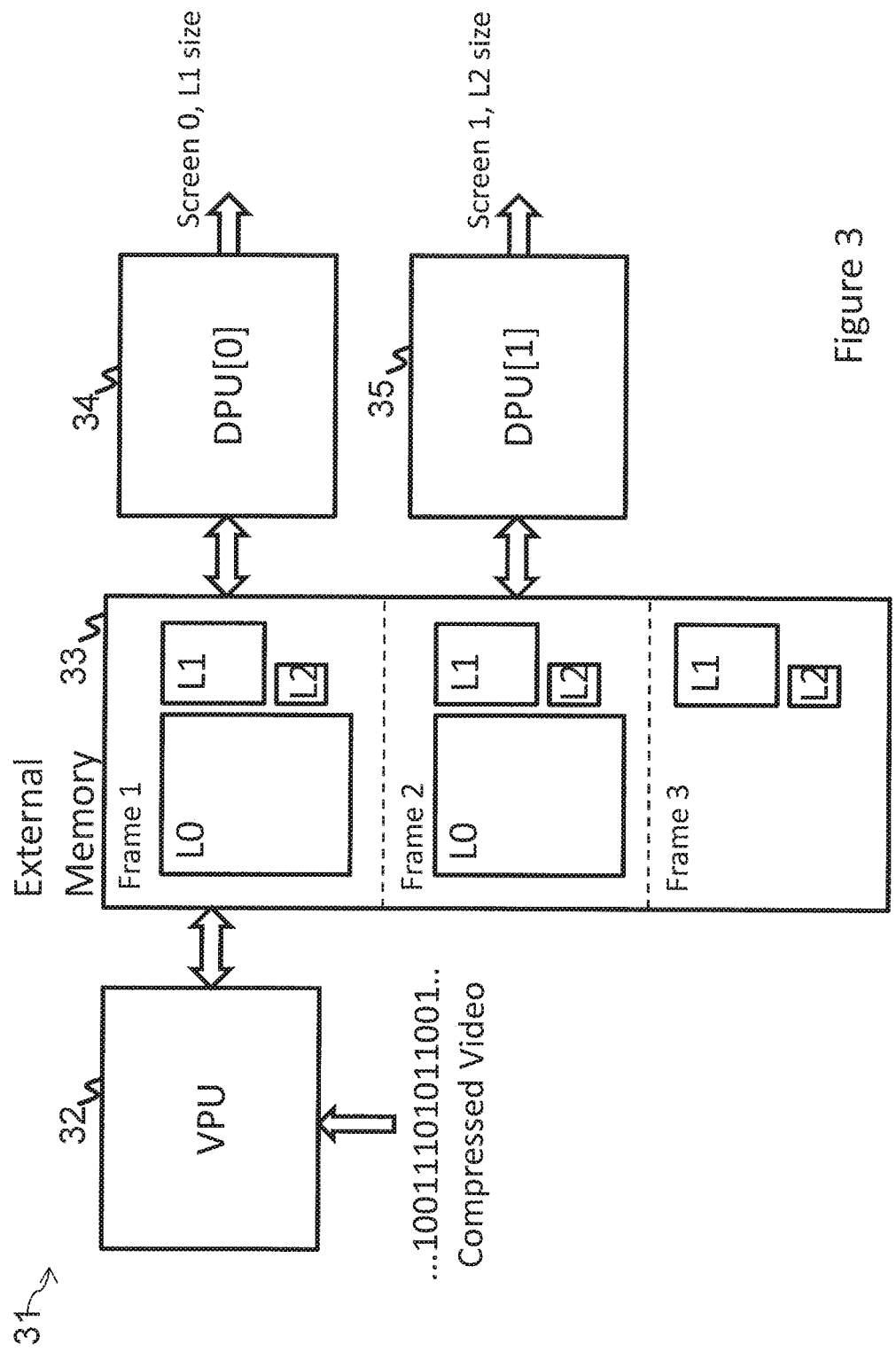
FIG. 3 shows schematically an embodiment of a video processing system that can perform the basic operation of the technology described herein.

FIG. 3 shows schematically an embodiment of a video processing system 31 that can perform the basic operation of the technology described herein.

As shown in FIG. 3, the video processing system includes a VPU 32, a first display processing unit (DPU[0]) 34 and a second display processing unit (DPU[1]) 35, all having access to external memory 33. The first DPU (DPU[0]) corresponds to a first display screen (screen 0) of size L1, and the second DPU (DPU[1]) corresponds to a second display screen (screen 1) of size L2.

According to embodiments of the technology described herein, the VPU 32 receives as an input compressed video data representing a sequence of video frames, including a reference frame from which other frames in the sequence are defined. In the embodiment shown, the compressed video data represents each frame in the sequence of video frames at a first resolution, L0.

The VPU 32 is configured to de-compress the compressed video input (one frame at a time) to generate decompressed video data representing the frames. Accordingly, the VPU 32 includes a de-compressor (not shown) for decompressing the video data (e.g. a frame to be displayed).

(It will be appreciated that de-compression of the compressed video data can be done in other ways, if desired. For example, instead of the VPU 32 including a de-compressor, a separate de-compression engine that receives the compressed video data and de-compresses them before sending them to the VPU 32 could be provided in the system.)

The VPU 32 is configured to generate and store in the external memory 33 pixel data representing the reference frame at the first, original resolution, L0. Thus, once the compressed video data representing the reference has been decompressed, the (decompressed) pixel data representing the reference frame is stored in memory 33. In accordance with the embodiments of the technology described herein, however, the VPU 32 is configured also to generate and store in memory 33 pixel data representing the reference frame at at least one different resolution to the first resolution. This may be achieved, for example, by performing appropriate scaling operations on the (de-compressed) reference frame.

In the embodiment shown in FIG. 3, the first frame (frame 1) in the sequence of video frames received by the VPU 32 is a reference frame as well as a frame to be output for display. Accordingly, the VPU 32 generates pixel data representing the reference frame at the first resolution L0 and stores it in memory 33, e.g., so that it can be used to define and decode other frames in the sequence of video frames. However, in addition to this the VPU 32 generates pixel data representing the reference frame at two different resolutions (L1 and L2) in addition to the first resolution (L0). This may be done by scaling the reference frame to the exact resolutions of the first and second display screen.

The second frame (frame 2) in the sequence of video frames is also flagged as a reference frame and an output frame, so pixel data pixel representing that reference frame at the first, second and third resolutions L0, L1 and L2 is also generated.

The third frame (frame 3) is not flagged as a reference frame, but is instead flagged as an output frame only. In this case, full pixel data representing the frame at full resolution is not required (as it will not be used to decode any other frames in the sequence), so the VPU 32 is configured to generate and store in memory 33 pixel data representing the frame at the one or more lower resolutions only. In the specific example shown, the VPU 32 generates pixel data representing the frame at the second and third resolutions, L1 and L2.

(This can be done by first decoding the frame using pixel data representing the corresponding reference frame (e.g. frame 2) at full resolution, and performing scaling operations on the (decoded) frame to generate pixel data representing the frame at one or more lower resolutions than the first resolution.)

The frames stored in memory can then be retrieved by an appropriate DPU (or DPUs) for display. In this regard, it will be appreciated that having lower resolution pixel data for the frames is advantageous in that only the smaller version of the current frame (be it the first, second or third frame of FIG. 3) needs to be read for display, thereby saving on memory bandwidth and accesses etc.

In the example shown in FIG. 3, each one of the first and second display units, DPU[0] and DPU[1], is configured to output the frames, except that DPU[0] will read in only the data representing the frame at the lower resolution, L1, whilst DPU[1] will read in only the data representing the frame at the lower resolution, L2.

(It will be appreciated that although FIG. 3 shows pixel data representing the reference frame at only two different resolutions than the first resolution, any number of different resolutions can be generated in addition to the first resolution. For example, the VPU may be configured to generate a full mipmap set. Also, whilst FIG. 3 shows two separate display processing units, any number of display processing units can be used. Further, the one or more lower resolutions, at which pixel data representing the frame is generated, need not correspond exactly to the resolution of the one or more display screens. Instead, the one or more lower resolutions can be chosen to be the closest level of a mipmap to the resolution of the one or more display screens, with any final scaling that is required being performed in the display processing unit.)

Figure 4:
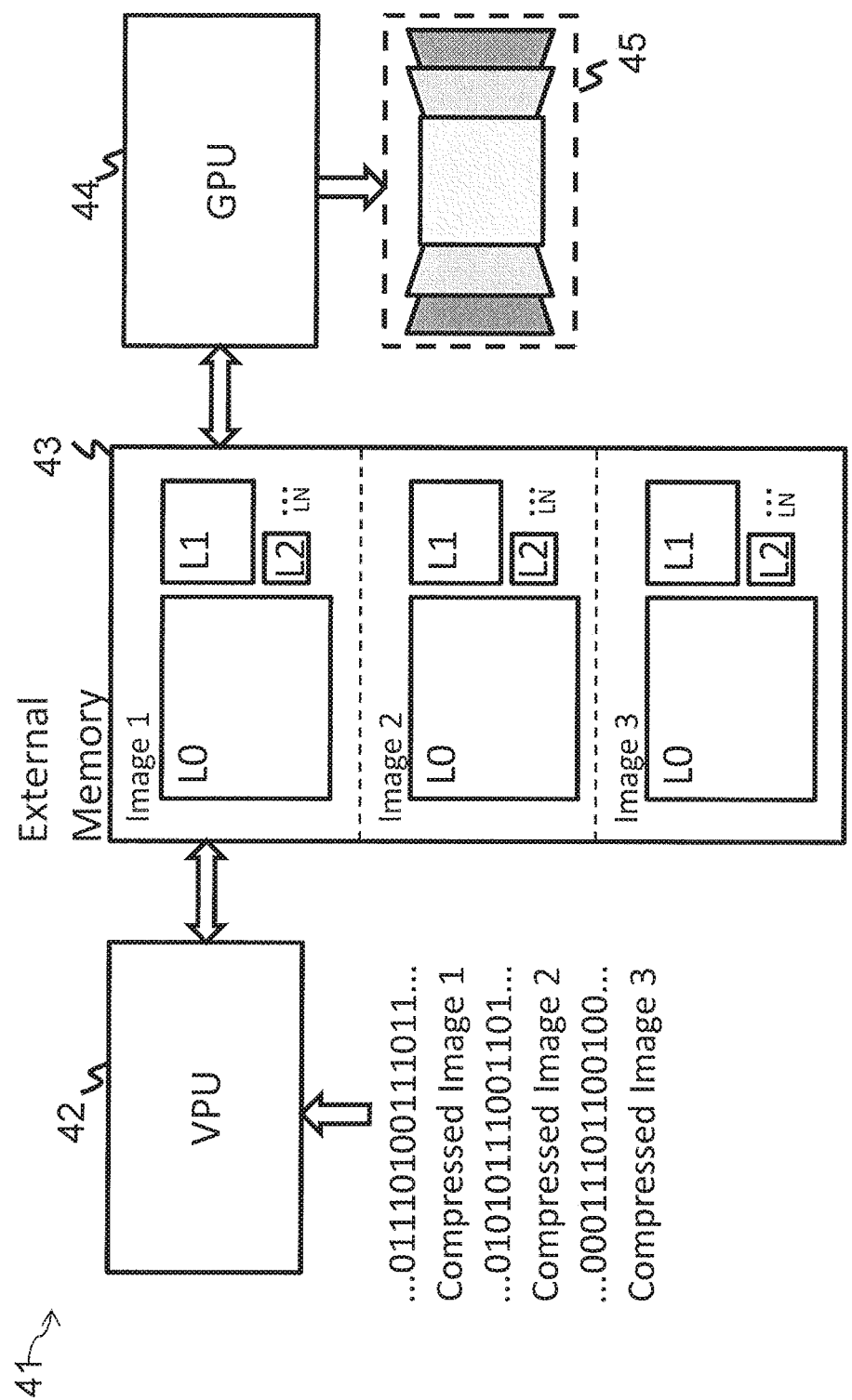
FIG. 4 illustrates schematically an embodiment of a video processing system having a video processor configured to process frames of still images in a manner according to the technology described herein.

FIG. 4 illustrates schematically an embodiment of a video processing system 31 that can perform the basic operation of the technology described herein, except that instead of processing a sequence of video frames, the video processor is configured to process frames of still images.

Similarly to the embodiment of FIG. 3, in this example the video processing system 41 includes a VPU 42, external memory 43, GPU 44 and a graphical user interface 45 on a display, for example.

As can be seen in FIG. 4, the VPU 42 is configured to receive a sequence of (compressed) still image frames from an image source (not shown) and generate and store in memory pixel data representing each frame at a first and at least one different resolution to the first resolution.

The VPU 43 is configured to generate and store in memory 43 pixel data representing each image in the sequence of still images as a complete mipmap. For example, the external memory 43 of FIG. 4 has pixel data stored therein that represents the image at successively lower resolutions, L0 through to LN.

The pixel data representing a frame or frames from memory is then retrieved from memory and used by GPU 44 to perform processing operations on the one or more frames, e.g. for display.

For example, the GPU 44 may be configured to read in and use the pixel data representing a frame at an at least one lower resolution than the first resolution to perform a transformation operation on the frame, such as a scaling, rotation or skewing operation. In other examples, the GPU 44 may be configured to read in and use pixel data representing more than one frame at an at least one lower resolution than the first resolution to perform operations for visually flipping through frames on graphical user interface 45 (such as "coverflow"-type operations).

Figure 5:
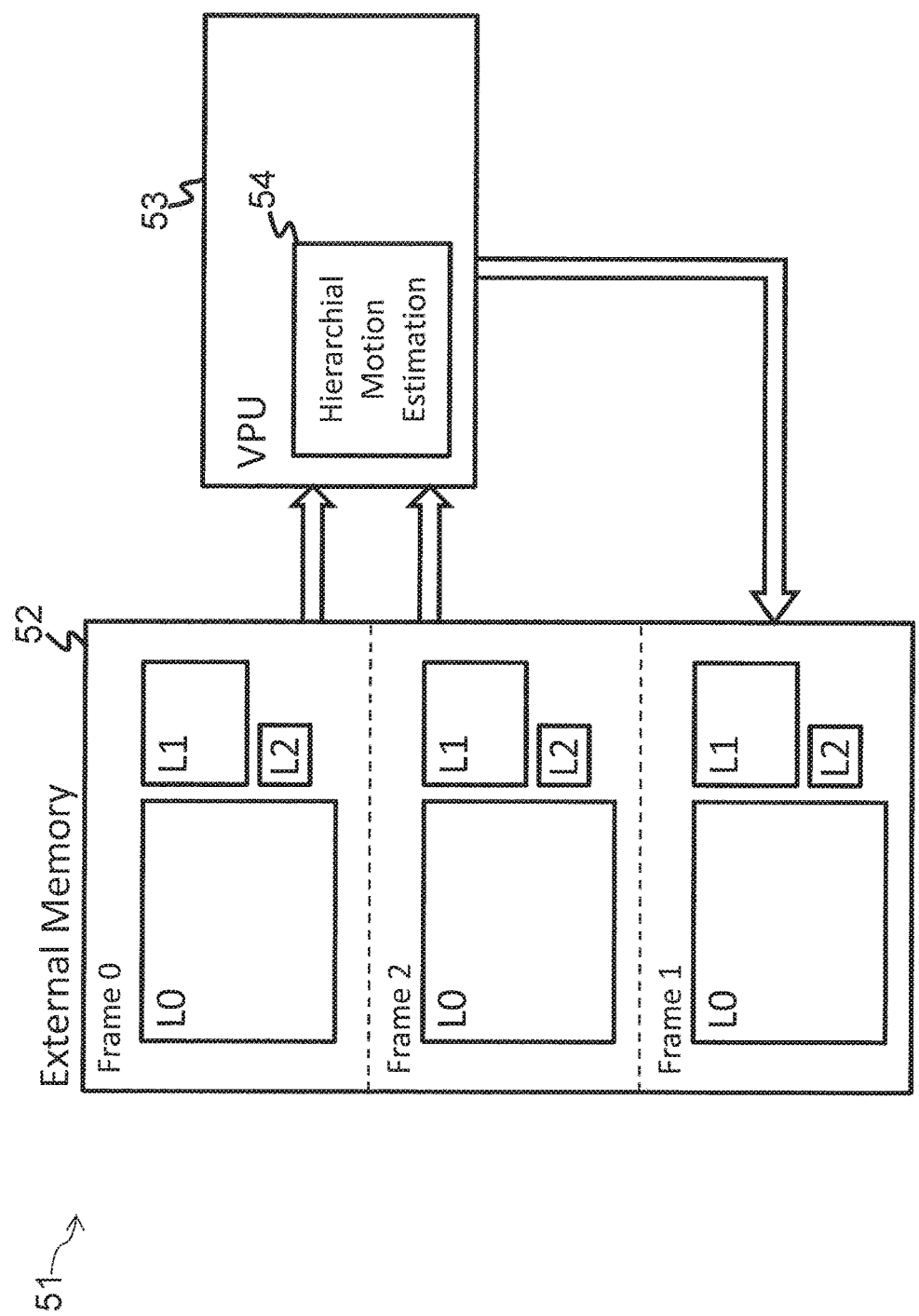
FIG. 5 illustrates schematically an embodiment of a video processing system that is configured to encode at least one frame in a sequence of video frames in a manner according to the technology described herein.

FIG. 5 illustrates schematically an embodiment of a video processing system that is configured to encode at least one frame in a sequence of video frames according to the technology described herein. The video processing system comprises external memory 52 and a VPU 53 having a hierarchical motion estimation encoder 54 therein.

The VPU 53 is configured to perform hierarchical motion estimation encoding on a given frame (frame 1) in a sequence of video frames. As shown, the frame is encoded as a bidirectional frame, i.e. a frame that is defined from both a previous frame (frame 0) and a future frame (frame 2) in the sequence of video frames. In the embodiment of FIG. 5, frame 0 and frame 2 are both reference frames, whilst frame 1 is to be encoded as an output frame only.

Accordingly, pixel data representing the reference frames (frames 0 and 2) at a first resolution and at least one different resolution is generated and stored in external memory 52. In the example shown in FIG. 5, pixel data representing the reference frames (frames 0 and 2) at a first resolution and at least one different resolution has already been generated and stored in the external memory 52 of the video processing system. (In this specific example, each reference frame is represented as a (e.g. sparse) mipmap set comprising a first, second and third resolution version of the reference frame (versions L0, L1 and L2, respectively), although other configurations are equally possible.)

The VPU 53, more particularly the encoder 54 of the VPU 53, is configured to read in pixel data representing the reference frames from memory 52 and use it to perform hierarchical motion estimation encoding on the frame in question (frame 1). In the embodiment shown in FIG. 5, the encoder 54 generates encoded pixel data representing the frame as a mipmap set, in an embodiment a sparse mipmap set containing only the levels that are being used by the hierarchical search scheme (that is, levels L0, L1 and L2).

The Applicants have recognised that having multiple resolution versions of the reference frame already stored in memory is advantageous for performing motion estimation encoding in a more efficient manner. In particular, having multiple resolution versions of the frame facilitates finding longer motion vectors, whilst keeping memory bandwidth down (by searching through lower resolution versions of the reference frame). For example, when it is desired to search for motion vectors in a lower resolution version of the reference frame, the VPU 53 can simply read in pixel data representing the reference frame at a lower resolution (instead of first reading in the full resolution pixel data and then scaling it down), thereby saving memory accesses and bandwidth.

It will be appreciated that although the VPU 53 of FIG. 5 is encoding a bidirectional frame, this is not required. Any compression scheme could be used as appropriate. For example, a frame may be encoded as a forward-predicted frame (e.g. from a single reference frame) or as a bidirectional predicted frame.

It can be seen from the above that the technology described herein, in its embodiments at least, provides a way of providing a more efficient video processing system in which data for one or more frames in a sequence of video frames is defined with respect to a reference frame.

This is achieved, in the embodiments at least, by, when all or part of a reference frame is required for decoding (or encoding) a sequence of video frames, generating and storing in memory pixel data representing all or part of the reference frame at a first, full resolution and at least one different (e.g. lower) resolution to the first resolution. The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of processing a sequence of video frames of video data in a video processing system, in which data for one or more frames in the sequence of video frames is defined with respect to a reference frame for the sequence of video frames, the method comprising:
determining that a frame in the sequence of video frames is a reference frame for the sequence of video frames to be used when decoding one or more other frames of the sequence of video frames;
and, in response to determining that the frame in the sequence of video frames is a reference frame, both:
generating and storing in memory pixel data representing all or part of the reference frame at a first resolution; and
generating and storing in memory pixel data representing all or part of the reference frame at at least one different resolution to the first resolution,
such that when a frame in the sequence of video frames is determined to be a reference frame, pixel data representing all or part of the reference frame at the first resolution and pixel data representing all or part of the reference frame at the at least one different resolution is present and available in memory at the same time prior to using the pixel data representing all or part of the reference frame at either of the first resolution and the least one different resolution to decode any of the other frames of the sequence of video frames;
and, after generating and storing in memory the pixel data representing all or part of the reference frame at both the first resolution and the at least one different resolution, using at least one of the pixel data representing all or part of the reference frame at the first resolution and the pixel data representing all or part of the reference frame at the at least one different resolution to decode at least one other frame of the sequence of video frames that is defined with respect to the reference frame.

2. The method of claim 1, further comprising:
configuring the reference frame pixel data generation based on how the pixel data for the reference frame is to be used by the video processing system.

3. The method of claim 1, further comprising:
configuring the reference frame pixel data generation based on how the pixel data for the reference frame is to be used by the video processing system such that:
the one or more or all of the at least one different resolution to the first resolution that the reference frame is generated at is selected based on the resolution of an electronic display or displays on which the video sequence is to be displayed; and/or
the number of different resolutions at which the reference frame is to be represented is selected based on the number of different displays in the overall video processing system on which the video sequence is to be displayed.

4. The method of claim 1, further comprising:
processing at least one frame in the sequence of video frames using the pixel data representing the reference frame at at least one different resolution to the first resolution.

5. The method of claim 4, wherein the step of processing at least one frame in the sequence of video frames comprises:
generating pixel data representing an output frame for display using the pixel data representing the reference frame at at least one lower resolution than the first resolution.

6. The method of claim 1, wherein, if the reference frame is to be displayed:
the pixel data for a lower resolution reference frame is used as the pixel data for the displayed frame.

7. The method of claim 1, further comprising, when a current frame in the sequence of video frames is encoded with respect to the reference frame:
decoding the current frame using the encoded pixel data for the current frame and the pixel data representing the reference frame at the first resolution; and
generating and storing in memory pixel data representing the current frame at at least one different resolution to the first resolution.

8. The method of claim 1, further comprising:
reading in from the memory the pixel data representing all or part of the reference frame at the at least one different resolution to the first resolution;
using the pixel data when generating an output frame to be displayed; and
outputting the generated output frame to a display.

9. The method of claim 1, further comprising:
reading in from memory the pixel data representing all or part of the reference frame at the at least one different resolution to the first resolution;
using the pixel data when performing a processing operation on a frame in the sequence of video frames to generate pixel data representing a processed frame; and
storing the pixel data representing the processed frame in memory.

10. An apparatus for processing a sequence of video frames of video data in a video processing system, in which data for one or more frames in the sequence of video frames is defined with respect to a reference frame for the sequence of video frames, the apparatus comprising:
reference frame determining circuitry configured to determine whether a frame in the sequence of video frames is a reference frame for the sequence of video frames to be used when decoding one or more other frames of the sequence of video frames; and
reference frame generation circuitry configured to, in response to the reference frame determining circuitry determining that the frame in the sequence of video frames is a reference frame, both:
generate and store in a memory of the video processing system, pixel data representing all or part of the reference frame at a first resolution; and
generate and store in the memory pixel data representing all or part of the reference frame at at least one different resolution to the first resolution,
such that when a frame in the sequence of video frames is determined to be a reference frame, pixel data representing all or part of the reference frame at the first resolution and pixel data representing all or part of the reference frame at the at least one different resolution is present and available in memory at the same time prior to the pixel data representing all or part of the reference frame at either of the first resolution and the least one different resolution being used to decode any of the other frames of the sequence of video frames;

and frame decoding circuitry configured to, after the reference frame generation circuitry generates and stores in memory the pixel data representing all or part of the reference frame at both the first resolution and the at least one different resolution, use at least one of the pixel data representing all or part of the reference frame at the first resolution and the pixel data representing all or part of the reference frame at the at least one different resolution to decode at least one other frame of the sequence of video frames that is defined with respect to the reference frame.

11. The apparatus of claim 10, wherein the reference frame pixel data generation is configured based on how the pixel data for the reference frame is to be used by the video processing system.

12. The apparatus of claim 10, wherein:
the reference frame pixel data generation is configured based on how the pixel data for the reference frame is to be used by the video processing system such that:
one or more or all of the at least one different resolution to the first resolution that the reference frame is generated at is selected based on the resolution of an electronic display or displays on which the video sequence is to be displayed; and/or
the number of different resolutions at which the reference frame is to be represented is selected based on the number of different displays in the overall video processing system on which the video sequence is to be displayed.

13. The apparatus of claim 10, further comprising:
frame processing circuitry configured to process at least one frame in the sequence of video frames using the pixel data representing the reference frame at at least one different resolution to the first resolution.

14. The apparatus of claim 13, wherein the frame processing circuitry is configured to:
generate pixel data representing an output frame for display using the pixel data representing the reference frame at at least one lower resolution than the first resolution.

15. The apparatus of claim 10, wherein, if the reference frame is to be displayed:
the pixel data for a lower resolution reference frame is used as the pixel data for the displayed frame.

16. The apparatus of claim 10, wherein the apparatus is configured to, when the current frame in the sequence of video frames is encoded with respect to the reference frame:
decode the current frame using the encoded pixel data for the current frame and the pixel data representing the reference frame at the first resolution; and
generate and store in memory pixel data representing the current frame at at least one different resolution to the first resolution.

17. A video processing system for processing a sequence of video frames of video data, in which data for one or more frames in the sequence of video frames is defined with respect to a reference frame for the sequence of video frames, the video processing system comprising:
a memory;
reference frame determining circuitry configured to determine whether a frame in the sequence of video frames is a reference frame for the sequence of video frames to be used when decoding one or more other frames of the sequence of video frames;
reference frame generation circuitry configured to, in response to the reference frame determining circuitry determining that a frame in the sequence of video frames is a reference frame, both generate and store in the memory pixel data representing all or part of the reference frame at a first resolution, and generate and store in the memory pixel data representing all or part of the reference frame at at least one different resolution to the first resolution, such that when a frame in the sequence of video frames is determined to be a reference frame, pixel data representing all or part of the reference frame at the first resolution and pixel data representing all or part of the reference frame at the at least one different resolution is present and available in memory at the same time prior to the pixel data representing all or part of the reference frame at either of the first resolution and the least one different resolution being used to decode any of the other frames of the sequence of video frames;
frame decoding circuitry configured to, after the reference frame generation circuitry generates and stores in memory the pixel data representing all or part of the reference frame at both the first resolution and the at least one different resolution, use at least one of the pixel data representing all or part of the reference frame at the first resolution and the pixel data representing all or part of the reference frame at the at least one different resolution to decode at least one other frame of the sequence of video frames that is defined with respect to the reference frame; and
a processing unit configured to read in from memory the pixel data representing all or part of the reference frame at the at least one different resolution to the first resolution, use the pixel data when performing a processing operation on a frame in the sequence of video frames to generate pixel data representing a processed frame and store the pixel data representing the processed frame in memory.

18. The system of claim 17, wherein:
the processing unit is a display controller of the video processing system;
using the pixel data when performing a processing operation on a frame in the sequence of video frames to generate pixel data representing a processed frame comprises generating pixel data representing an output frame to be displayed, using the pixel data representing all or part of the reference frame at the at least one different resolution to the first resolution; and
the display controller is configured to output the generated output frame data to a display.

19. A computer readable storage medium storing computer software code which when executing on a processor performs a method of processing a sequence of video frames of video data in a video processing system, in which data for one or more frames in the sequence of video frames is defined with respect to a reference frame for the sequence of video frames, the method comprising:
determining that a frame in the sequence of video frames is a reference frame for the sequence of video frames to be used when decoding one or more other frames of the sequence of video frames;
and, in response to determining that the frame in the sequence of video frames is a reference frame, both:

generating and storing in memory pixel data representing all or part of the reference frame at a first resolution; and generating and storing in memory pixel data representing all or part of the reference frame at at least one different resolution to the first resolution, such that when a frame in the sequence of video frames is determined to be a reference frame, pixel data representing all or part of the reference frame at the first resolution and pixel data representing all or part of the reference frame at the at least one different resolution is present and available in memory at the same time prior to using the pixel data representing all or part of the reference frame at either of the first resolution and the least one different resolution to decode any of the one or more other frames of the sequence of video frames;

and, after generating and storing in memory the pixel data representing all or part of the reference frame at both the first resolution and the at least one different resolution, using at least one of the pixel data representing all or part of the reference frame at the first resolution and the pixel data representing all or part of the reference frame at the at least one different resolution to decode at least one other frame of the sequence of video frames that is defined with respect to the reference frame.

* * * * *